April 22, 1958   J. C. BENNETT ET AL   2,831,735
LONGITUDINALLY ADJUSTABLE RUNNING GEAR FOR VEHICLES
Filed March 15, 1954   3 Sheets-Sheet 1
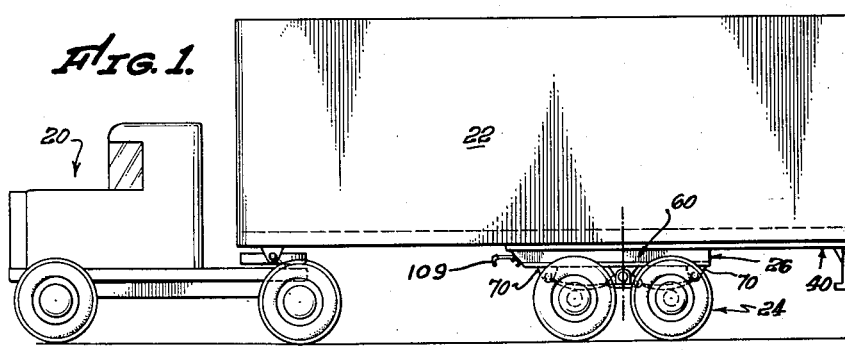
FIG. 1.
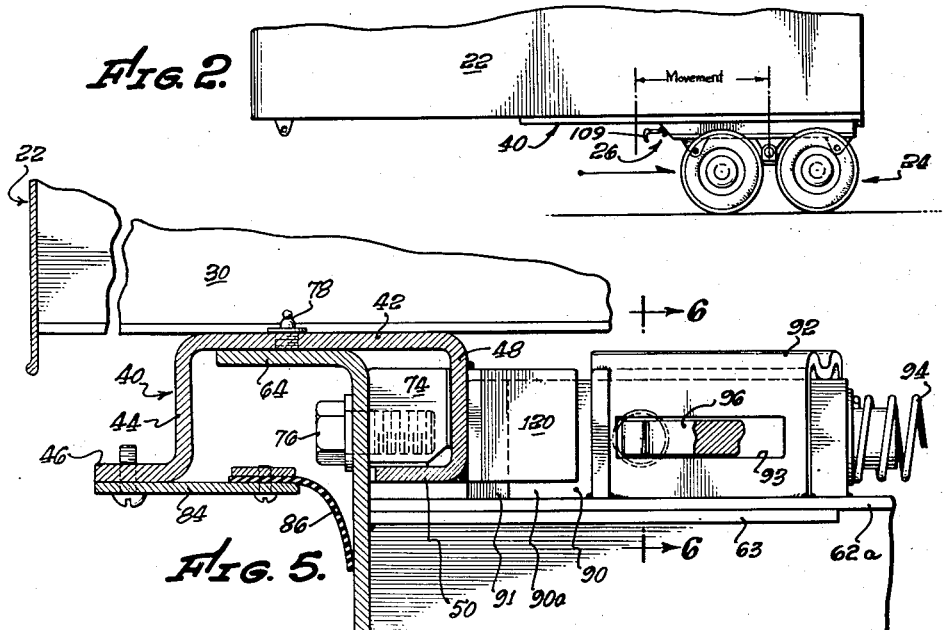
FIG. 2.
FIG. 5.
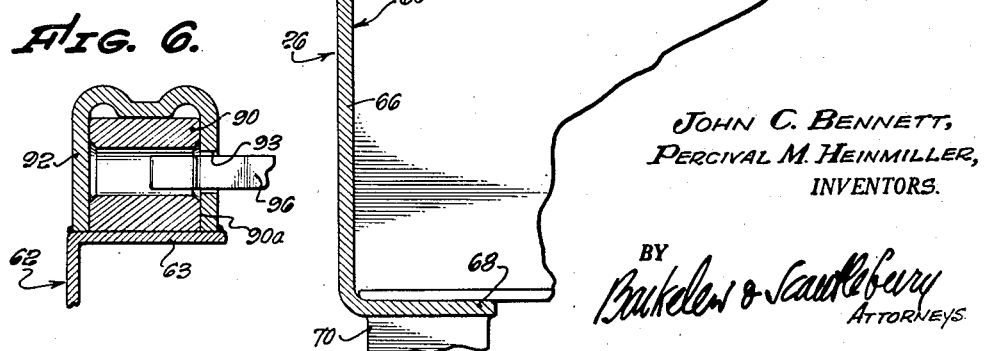
FIG. 6.
JOHN C. BENNETT,
PERCIVAL M. HEINMILLER,
INVENTORS.

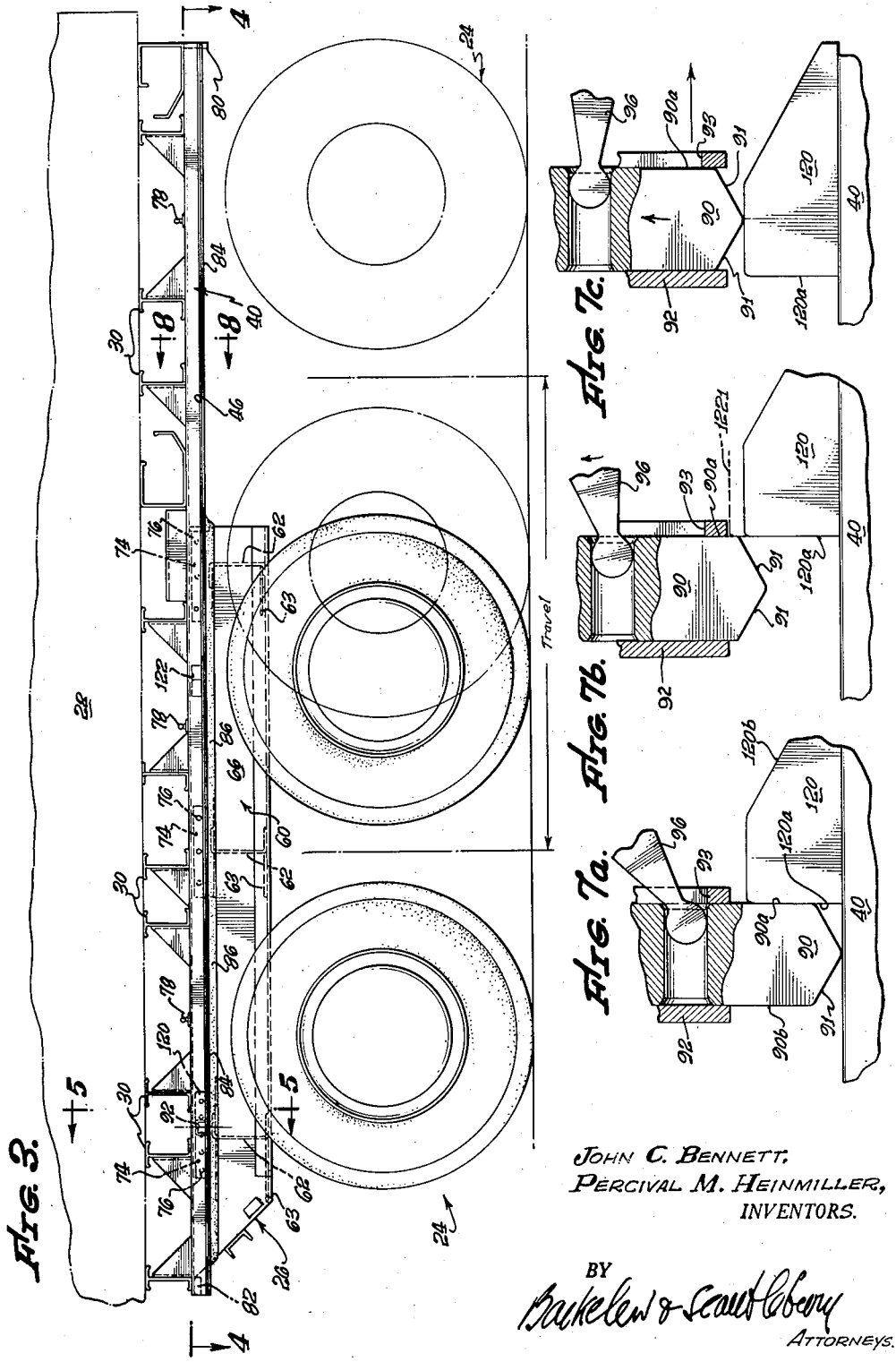

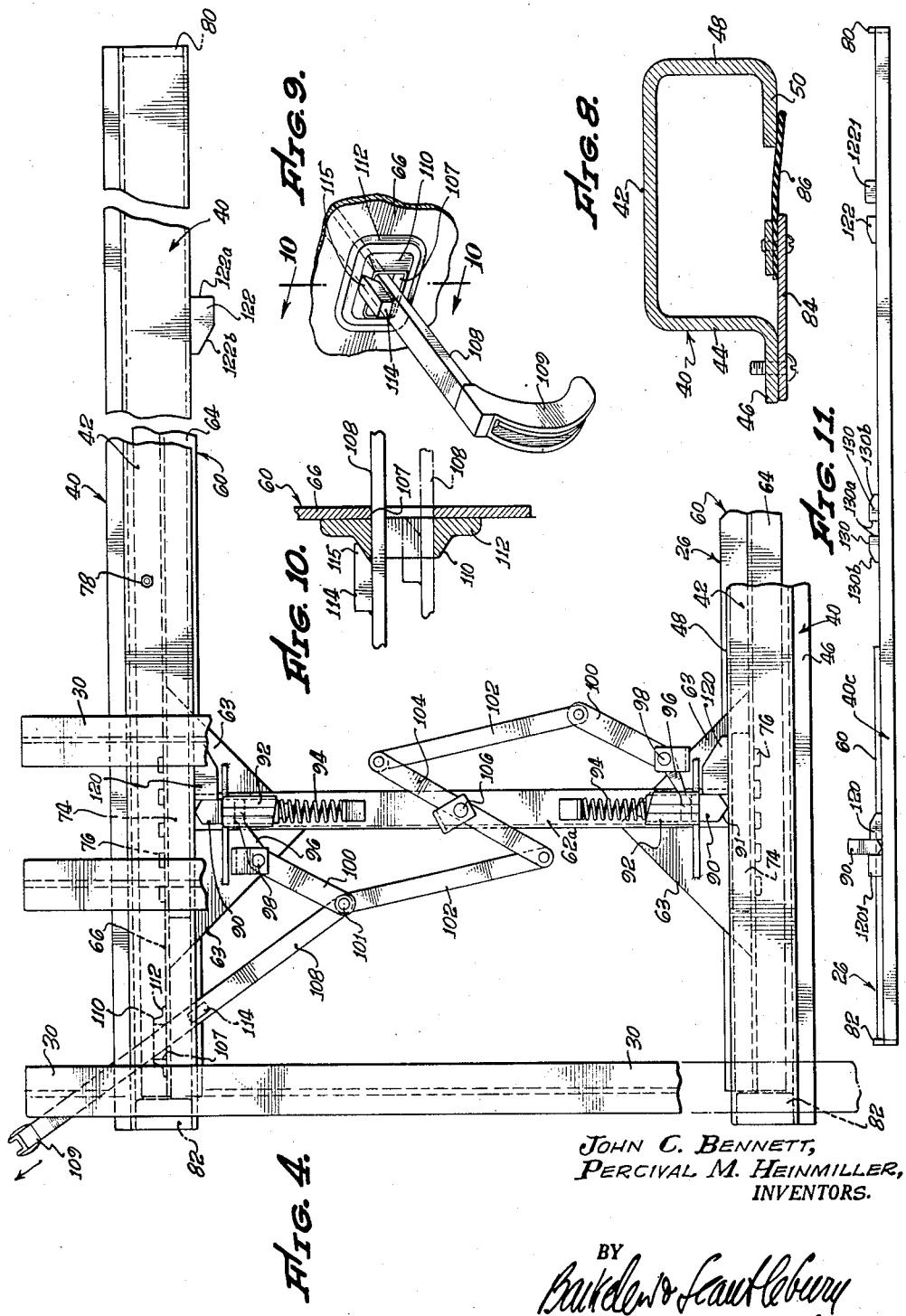

United States Patent Office 2,831,735
Patented Apr. 22, 1958

2,831,735

LONGITUDINALLY ADJUSTABLE RUNNING GEAR FOR VEHICLES

John C. Bennett, Pasadena, and Percival M. Heinmiller, La Canada, Calif., assignors to Utility Trailer Manufacturing Company, Los Angeles, Calif., a corporation of California Application March 15, 1954, Serial No. 416,110

5 Claims. (Cl. 308—3)

This invention has to do with the shifting of vehicular running gear longitudinally with respect to the load carrying body or frame. A preferred form of the invention is here shown and described as applied to a semi-trailer, but the invention, as will be readily recognized, may be applied to any type of load carrying vehicle.

The desirability of providing longitudinal shiftability for the running gear or other supporting elements of vehicle frames, particularly load carrying vehicles such as trucks, trailers, semi-trailers and their tractors, has long been recognized and need not here be discussed in detail. Among the objects of the present invention are the provision of an improved design and structure which is simple, economical to produce, of light weight, readily lubricated and protected from dirt on its sliding surfaces, and automatically locked in selected set positions. Other objects, and the corresponding features and characteristics of the invention will appear from the following detailed description of a preferred and illustrative embodiment applied to the rear running gear of a trailer. As has been indicated, however, the shiftable structure of the invention may be applied to the running gear of any vehicle.

Reference is had to the accompanying drawings where:

Figs. 1 and 2 are a schematic side elevation showing the illustrative embodiment applied to a semi-trailer, showing the rear running gear in two different longitudinal positions;

Fig. 3 is an enlarged fragmentary side elevation showing the rear portion of the trailer framing with the shifting frame in one of its positions;

Fig. 4 is a partial and fragmentary plan of the framings and devices shown in Fig. 3 and taken on line 4—4 therein;

Fig. 5 is an enlarged detail section taken on line 5—5 of Fig. 3;

Fig. 6 is a detail section on line 6—6 of Fig. 5;

Figs. 7a, 7b and 7c are partially sectioned fragmentary enlargements of the plan view of the locking mechanism shown in Fig. 4;

Fig. 8 is a detail section on line 8—8 of Fig. 3;

Fig. 9 is a perspective showing the preferred form and arrangement of the lock operating handle shown in Fig. 4;

Fig. 10 is a section on line 10—10 of Fig. 9; and

Fig. 11 is a schematic view showing certain modifications.

In the drawings a typical semi-trailer and tractor assembly is shown in Fig. 1; the tractor at 20, trailer body at 22, the rear running gear at 24, and the shiftable framing at 26. The trailer structure may be of any type; for instance either of the type having a main frame composed of longitudinal and transverse beams, or of the type where a skin-stressed body provides the longitudinal load carrying beam and cross beams extend between the body side walls to carry the floor. The latter type is here shown; but the cross beams 30 shown in Figs. 3, 4 and 5 typify elements of any type of vehicle framing.

In the present preferred embodiment of the invention two longitudinal slide-way stringers 40, of lengths suitable to accommodate the shift distance desired in any particular installation, are secured, as by welding, to the under faces of cross beams 30. The preferred cross-sectional shape of these stringers is shown in Fig. 5; comprising an upper horizontal web 42, an outside vertical flange 44 terminating at its lower edge in a horizontal flange 46, and an inside vertical flange 48 terminating in a horizontal flange 50 which is turned in to be positioned under the upper web 42.

A longitudinally sliding frame is made up of two longitudinal beams 60 and several (here shown as three) cross beams 62, welded to the longitudinals and braced by welded gussets 63. Longitudinal beams 60 have outwardly turned flanges 64 at the tops of their vertical webs 66, and inwardly turned flanges 68 at the bottom. The spring shackles 70 of the running gear 24 are mounted on the under sides of lower flanges 68. For simplicity of illustration, those shackles, shown in Figs. 1 and 2, are not specifically shown in Fig. 3.

The longitudinal beams 60 of the shiftable frame ride with their upper flanges 64 bearing upwardly on the lower faces of stringer webs 42, as is clearly shown in Fig. 5. It will be understood that the structure and relations of the other set of longitudinal beam and stringer are the same as those of the set shown in Fig. 5; the whole stringer and shiftable frame structure being symmetric about a central vertical longitudinal plane.

Cross beams 62 are of lesser vertical extent than the longitudinal beams 60 so that the upper flanges 63 of the cross beams clear the lower flanges 50 of the stringers.

To hold the shiftable frame from dropping down relative to the stringers and the trailer frame, and to provide lateral thrust bearings for the shifting frame on the stringers, bearing blocks 74 are secured, as by cap screws 76, to the inner faces of beam webs 66 to ride on the upper faces of stringer flanges 50 and to bear laterally slidingly on the outer (inside) faces of stringer flanges 48. These bearing blocks are spaced along the length of beams 60; three in number as shown here, one near each end and one near the center. See Fig. 3 where their longitudinal locations are shown. Greasing fittings 78 provide for injecting lubricant into the interior of the stringers to lubricate the sliding bearing faces of flanges 64 and of blocks 74.

The longitudinal shift of the sliding frame is limited fore and aft by stop blocks 80 at the rear and 82 at the front. These blocks may be welded into position across the interiors of stringers 40. However, the rear stops 80 may be removably bolted in position so that, with them removed, the whole sliding frame may be inserted into, or removed from, the stringers by movement through the then open rear ends of the stringers. With the rear stops welded in position, the cap screws 76 can be threaded into blocks 74 after the sliding beams are moved up into the stringers; and removal of the cap screws allows the sliding frame to drop down out of the stringers.

To exclude foreign matter, road grit, dust, etc., from the bearing surfaces, two provisions are made. One; the webs 66 of longitudinal beams 60 ride close to the edges of stringer flanges 50. The other is a closure for the downwardly facing open interior of the stringers. In the specific illustrative design here shown, which permits the sliding frame to drop away from the stringers for disassembly, the space between stringer flanges 50 and 44 is necessarily at least as wide as the beam flange 64. The otherwise open space between 44 and the beam web 66 is then closed by a flexible resilient flap of rubber or similar material. As here shown, a plate 84 is removably secured under flange 46 to extend its inner edge fairly close to web 66. The rubber flap 86 is secured along one edge to the inner edge of plate 84, the flap being wide enough to reach under the flange 50 (see Fig. 8). Both plate 84 and flap 86 extend in length the whole distance between the front and rear stops 82 and 80; a distance which is of course greater than the length of the shiftable frame. Over the lengths of the beams 60 the flaps are warped down, as in Fig. 5, to engage the outer faces of beam webs 66. Through the remainder of the distance between the stops, the flaps 86 spring up to engage the under faces of flanges 50, as in Fig. 8. Thus, except for small triangular openings at the ends of the longitudinal beams 60 where the flaps are flexing from one position to the other, the interior of the stringers and the several bearing faces are substantially wholly sealed from external dirt.

The sealing arrangement that has been described is preferable because it allows the shiftable frame to be assembled with and detached from the stringers by relative vertical movement rather than longitudinal. As noted above, the said movement can be longitudinal if rear stops 80 are removably bolted in place. The welded stops, however, give a security against accidental separation of the shiftable frame on the road that a bolted stop cannot give. It may be remarked, though, that if bolted stops are used and the frame assembled and removed by longitudinal movement, the sealing of the otherwise open space between 44 and 66 can be accomplished in substantially the same manner as between 50 and 66—simply by close approach of a flange to web 66. Thus, for instance 84 might be integral with 44 and approach 66 closely, as 50 does, and then depend on that close approach with or without a sealing flap like 86. And, in that connection, it may be remarked that 50 may be equipped with a sealing flap like 86 if desired.

The present preferred form of automatic locking mechanism for the shiftable frame is shown in Fig. 4, with details in Figs. 5, 6, 7, 9 and 10. Two sliding latch bolts 90 are mounted in guides 92 on the upper flange 62a of one of the frame cross-beams 62, to slide in directions transverse of the longitudinal beams 60 and stringers 40. Springs 94 are applied preferably directly to the bolts to normally press them outwardly to such positions as are shown in Figs. 4 and 5 where their outer bevelled ends 91 are close to or bear against the inner opposing faces of stringer flanges 48. Bolt guides 92 are slotted at 93 to pass the bolt actuating arms 96 of bell-crank levers that are pivoted on the frame at 98. The other arms 100 of those levers are connected by links 102 to the opposite ends of a swinging member 104 which is centrally pivoted at 106 on the frame. A manipulation bar 108 is connected at one end to the bolt actuating system, for instance at the pivotal point 101. This bar 108 extends outwardly, at a level below stringer 40, through an opening 107 in the web 66 of one of the longitudinal beams 60 and has a handle 109 on its outer end in a position under the side of the vehicle frame or body where it can be conveniently reached.

The bar-passing opening 107 in web 66, as best shown in Figs. 9 and 10, is formed with an outwardly projecting lip 110 at least at its upper edge. Conveniently the opening 107 and the lip are formed in a piece 112 welded to the web 66. Opening 107 is larger vertically than the bar 108 so that when the bar rests on the lower edge of the opening (dotted lines in Fig. 10) a catch 114 which is welded to the upper face of the bar may pass through the opening. The catch has an overhanging end 115 which can be hung up on lip 110 when the bar is pulled out to retract the bolts 90 against the pressure of springs 94. Once the manipulating bar is so hung up, springs 94 act to hold it there, as they act to pull inwardly on the bar.

Fig. 4 shows the shiftable frame in its forward position with the forward ends of beams 60 up against the forward stops 82. In that position the projected latch bolts 90 bear with their flat rear faces 90a against the forward facing flat faces 120a of locking lugs 120 which are fixedly set, as by welding, on the inner faces of stringer flanges 48. See also Fig. 7a. The shiftable frame is thus held fixedly in its forward position effectively between the forward stops 82 and the locking lugs 120. In their projected outer positions the bolts may be limited (stopped) in outward movement either by bearing against 48, or by any other suitable stop means.

When it is desired to move the shiftable frame from its forward to its rear position (or to any other position as will be presently described) handle 109 is pulled out and the bar 108 hung up by its catch 114 as shown in full lines in Fig. 10. In that position of the operating handle latch bolts 90 are retracted to and held in the position shown in Fig. 7b. The shiftable frame is then moved relatively rearwardly, by blocking or braking the rear wheels and moving the tractor and the trailer frame forwardly by tractor power. As the trailer frame with the stringers 40 and lock lugs 120 move forward, the lugs ride under bolts 90, pushing the bolts in by reaction with one of their bevelled end faces 91. By that action operating bar 108 is pushed out, and catch 114 pushed away from lip 110, so that the bar then drops down. Then, when lugs 120 have passed completely under the bolts, springs 94 immediately move the bolts clear out to their projected positions of Fig. 7a.

Then, as the rear end of the shiftable frame approaches the rear stops 80, the forwardly facing bevelled faces 122b of the rear locking lugs 122 (one of which is shown in Fig. 4) push the bolts inwardly to ride over those lugs. The just as the frame rear end comes up against the rear stops, the bolts are moved out by their springs to engage their flat forward faces 90b behind the flat rear faces 122a of lugs 122. The frame is then held in its rearward position between the rear stops and the locking lugs 122.

Operation to move the shiftable frame from its rear to its forward position is similar. Operating handle 109 is pulled out and hung up on the catch 114. On relative rearward movement of the trailer frame, the rear locking lugs ride forwardly under the latch bolts, releasing the bar 108 to drop down and allow the bolts to be then fully projected. On reaching the forward lugs 120, the bolts are pushed back by their rearwardly facing bevelled faces 120b, and the bolts then ride over the lugs and are finally projected to the locking positions of Figs. 4 and 7a at the forward faces 120a of the lugs.

Fig. 11 shows schematically how locking lugs can be arranged to lock the shiftable frame in more than two different positions. In that figure a slide-way stringer is shown at 40c with the stops 80 and 82 at its two ends. One of the longitudinal beams of the shiftable frame is shown at 60, the frame carrying the latch bolts the same as before described. Forward and rear locking lugs 120 and 122 are the same as before described and the frame is released from and locked between them and the fore and aft stops in the manner before described. For a third position of the shiftable frame (and this applies to any desired number of intermediate positions) a pair of locking lugs 130 is set on stringer 40c in the proper longitudinal location for an intermediate position. These lugs, similar to lugs 120 and 122 have their flat end faces 130a facing each other and spaced apart just far enough to receive bolt 90 between them. Their bevelled faces 130b face away from each other.

If it is desired to move the shiftable frame from, say, its forward position shown in Fig. 11 to an intermediate position, the operation of release from forward lugs 120 is the same as before explained, the bolts being fully projected as soon as lugs 120 have passed under them. On reaching the forward lugs 130, the bolts ride over them in the same manner that has been previously explained for the rear lugs 122. Then, unless restrained by manipulation of handle 109, the bolts are projected out between the pairs of lugs 130 to lock the shiftable frame in the intermediate position. If it is desired to pass that intermediate position to set the frame in another position, e. g. the rear position, it is only necessary to hold handle 109 out momentarily as the bolts pass 130. Release of the handle then allows the bolts to project to lock the frame in the next, e. g. the rear, position. If the shiftable frame has been locked in the intermediate position, its release from that position and movement to any other locking position is accomplished by manipulation of handle 109 and movement of the trailer frame in the same manner as before described.

It may be remarked now that the shiftable frame may be locked in its extreme fore and aft positions as well as in intermediate positions by the use of double sets of locking lugs. Fig. 11 also shows that schematically. Forward lugs 1201 forms a pair with 120, 1221 a pair with 122. When the bolts 90 reach forward position, whether or not stop 82 is used, the bolts project out between 1201 and 120 to lock the frame in that position. Similarly the bolts, projected between 122 and 1221 lock the frame in that position. By making lugs 1201 and 1221 higher than 120 and 122 (see Fig. 11 and the height for lug 120 indicated at 1221 in dotted lines in Fig. 7b) they may be high enough that the bolts in the hung up position of Fig. 7b will not ride over them. Lugs 1201 and 1221 can be thus made to act as positive stops which cannot accidentally be passed by the bolts if handle 109 is mistakenly drawn out. As positive stops they can take the place of the end stops 80 and 82, but the latter are preferred because of their fully positive and dependable action in completely preventing separation of the shiftable frame from the trailer frame in the event of the latch bolts failing to operate properly.

We claim:

1. In a vehicle construction, the combination of a pair of parallel laterally spaced and longitudinally extending slide-way stringers, said stringers each having an upper horizontal web presenting a downwardly facing bearing surface, a downwardly turned flange at one edge of the web, and a horizontally turned flange at the lower edge of the vertical flange presenting an upwardly facing bearing surface, a slidably shiftable load bearing sub-frame slidably engaging the slide-way stringers and composed of two parallel laterally spaced and longitudinally extending beams and cross beams tying the longitudinal beams together, each of the longitudinal beams embodying a vertical web with a horizontally turned flange at its upper edge, said beam flanges slidably bearing upwardly against the downwardly facing bearing surfaces of the stringer webs, sliding bearing means carried by the beam webs overlying the horizontal flanges of the stringers and slidably bearing laterally against the downwardly turned flanges of the stringers, the slide-way stringers being of general inverted U-section and having downwardly turned flanges at the other edges of their webs, and means sealing the space between said last mentioned flanges and the beam webs of the sliding frame.

2. The combination defined in claim 1 and in which the sealing means comprises a flat strip of rubber-like material secured along one longitudinal edge to the last mentioned vertical stringer flange to normally lie substantially in a horizontal plane and of sufficient width that its opposite edge may contact the horizontal stringer flange.

3. In a vehicle construction, the combination of a longitudinally extending slide-way stringer having an upper horizontal web presenting a downwardly facing bearing surface, a downwardly extending flange formation at one edge of the web, a longitudinally shiftable beam having a vertical web and a horizontal flange at its upper edge bearing upwardly slidably on the bearing surface of the stringer web, and means sealing the space between the flange formation of the stringer and the web of the beam, the stringer web also having a second flange formation extending downwardly from its other edge, and the sealing means comprising a flat strip of rubber-like material secured along one longitudinal edge to the first mentioned stringer flange formation to normally lie substantially in a horizontal plane and of sufficient width that its opposite edge may contact the second mentioned stringer flange formation.

4. In a vehicle construction, the combination of a pair of parallel laterally spaced and longitudinally extending slide-way stringers, said stringers each having an upper horizontal web presenting a downwardly facing bearing surface, a downwardly turned flange at one edge of the web, and a horizontally turned flange at the lower edge of the vertical flange presenting an upwardly facing bearing surface, a slidably shiftable load bearing sub-frame slidably engaging the slide-way stringers and composed of two parallel laterally spaced and longitudinally extending beams and cross beams tying the longitudinal beams together, each of the longitudinal beams embodying a vertical web with a horizontally turned flange at its upper edge, said beam flanges slidably bearing upwardly against the downwardly facing bearing surfaces of the stringer webs and extending from the beam webs in directions away from the downwardly turned flanges of the stringers, and sliding bearing means detachably carried by the beam webs overlying the horizontal flanges of the stringers.

5. The combination defined in claim 4 and in which the stringers also have downwardly turned flanges at their other edges, and including sealing means each comprising a flat strip of rubber-like material secured along one edge to the last mentioned stringer flange to normally lie substantially in a horizontal plane and of sufficient width that its opposite edge may contact the horizontal stringer flange.

References Cited in the file of this patent

UNITED STATES PATENTS

| Re. 23,704 | De Lay | Sept. 1, 1953 |
| 875,766 | Allen | Jan. 7, 1908 |
| 1,037,302 | Parent | Sept. 3, 1912 |
| 1,358,867 | Needle | Nov. 16, 1920 |
| 1,540,131 | Johannesmeyer et al. | June 2, 1925 |
| 1,750,933 | Koons | Mar. 18, 1930 |
| 1,903,431 | Abbe | Apr. 11, 1933 |
| 2,277,703 | Kennedy et al. | Mar. 31, 1942 |
| 2,332,326 | Lex | Oct. 19, 1943 |
| 2,387,093 | Schmied | Oct. 16, 1945 |
| 2,676,815 | Bennett | Apr. 27, 1954 |